United States Patent
Weiss et al.

(10) Patent No.: US 11,617,239 B2
(45) Date of Patent: Mar. 28, 2023

(54) METHOD AND DEVICE FOR THERMALLY ACTIVATING A FUNCTIONAL LAYER OF A COATING MATERIAL

(71) Applicant: HOMAG GmbH, Schopfloch (DE)

(72) Inventors: Ruven Weiss, Alpirsbach (DE); Ludwig Albrecht, Dornstetten-Aach (DE)

(73) Assignee: HOMAG GmbH, Schopfloch (DE)

( * ) Notice: Subject to any disclaimer, the term of this patent is extended or adjusted under 35 U.S.C. 154(b) by 561 days.

(21) Appl. No.: 16/621,216

(22) PCT Filed: Jun. 19, 2018

(86) PCT No.: PCT/EP2018/066221
§ 371 (c)(1),
(2) Date: Dec. 10, 2019

(87) PCT Pub. No.: WO2018/234295
PCT Pub. Date: Dec. 27, 2018

(65) Prior Publication Data
US 2020/0107410 A1    Apr. 2, 2020

(30) Foreign Application Priority Data
Jun. 20, 2017  (DE) .................... 10 2017 210 261.6

(51) Int. Cl.
*H05B 6/68* (2006.01)
*B32B 37/06* (2006.01)
(Continued)

(52) U.S. Cl.
CPC ............ *H05B 6/686* (2013.01); *B32B 37/06* (2013.01); *B32B 37/1207* (2013.01); *H05B 1/0247* (2013.01)

(58) Field of Classification Search
CPC . H05B 6/686; H05B 1/0247; H01J 37/32229; H01J 37/32293
See application file for complete search history.

(56) References Cited

U.S. PATENT DOCUMENTS

2003/0106891 A1*  6/2003  Fagrell .................. H05B 6/806
                                                        219/690
2008/0062105 A1*  3/2008  Han ................... H05B 41/3927
                                                        345/90

FOREIGN PATENT DOCUMENTS

CN          106507526 A      3/2017
DE          102014006116     10/2015
(Continued)

*Primary Examiner* — Abdullah A Riyami
*Assistant Examiner* — Syed M Kaiser
(74) *Attorney, Agent, or Firm* — Nathan S. Smith; Morgan, Lewis & Bockius LLP

(57) ABSTRACT

The present invention relates to a method for thermally activating a functional layer of a coating material, preferably an edge material, wherein the method comprises the following steps: providing the coating material; feeding the coating material to a device for thermally activating a functional layer of the coating material; and thermally activating the functional layer of the coating material, wherein the thermal activation of the functional layer of the coating material occurs by microwaves which are generated by at least one semiconductor wave generator. The present invention also relates to a device for thermally activating a functional layer of a coating material.

17 Claims, 2 Drawing Sheets

(51) Int. Cl.
*B32B 37/12* (2006.01)
*H05B 1/02* (2006.01)

(56) References Cited

FOREIGN PATENT DOCUMENTS

| | | | |
|---|---|---|---|
| EP | 2621246 | 7/2013 | |
| EP | 2621246 A1 * | 7/2013 | ............. H05B 6/686 |
| EP | 2965888 | 1/2016 | |
| EP | 2965888 A1 * | 1/2016 | ........... B29B 13/023 |
| JP | 3399135 B2 * | 4/2003 | |
| WO | WO 97/36728 | 10/1997 | |
| WO | WO 2016/005145 | 1/2016 | |

\* cited by examiner $f_{nenn} = f_{rated}$

METHOD AND DEVICE FOR THERMALLY ACTIVATING A FUNCTIONAL LAYER OF A COATING MATERIAL

OBJECT OF THE INVENTION

The present invention relates to a method for thermally activating a functional layer of a coating material and a device for thermally activating a functional layer of a coating material. In addition, the present invention relates to a method for applying coating material to a narrow area of a workpiece and a device for applying coating material to a narrow area of a workpiece.

PRIOR ART

The established method is to coat surfaces of plate-shaped workpieces, in particular intersections of these workpieces, referred to as narrow workpiece areas, with a strip-shaped coating material. Firstly, this allows the narrow area to be adapted to the properties of the surface of the workpiece without requiring elaborate rework. Secondly, a coating of this kind allows the core of the workpiece to be designed with a different material, for example a cheaper one, to that on the surfaces visible externally.

An adhesive or glue is used to join the workpiece to the coating material. In particular, an adhesive is used which is activated by an application of energy, and only then can a resilient connection between two components (coating material and workpiece) be created.

There are a multitude of options for incorporating this adhesive into the joining process. For example, EP 1 163 864 B1 suggests a method in which a plastic edge with an adhesive layer is coextruded. This bond between the coating material and the activatable functional layer (or adhesive layer) is then melted onto the workpiece in the area containing the adhesive by means of a laser light and pressed onto the workpiece.

The activation of this functional layer with hot air is also known. A device is provided here that directs a controlled stream of hot air onto a coating material of this kind in order to thermally activate it, in other words to heat it.

The common feature of both known methods for activating the functional layer, in other words with hot air or a laser light, is that they must be optimised specifically to suit a particular product, which means that a general readjustment and optimisation of the production system will be necessary if, for example, different properties are required for the adhesive or a different coating material is used.

However, an ever-increasing variety of products are being required in the furniture industry, for example, bringing with them corresponding requirements for machine tools. In the same way as the fashion industry, furniture companies are changing their collections at increasing frequency and offering, for example, new colour combinations or multi-functional furniture lines that have a coordinated design for different functional areas, such as the living room, kitchen and bathroom. A further consideration is that furniture has to be manufactured not just for private use, but also for industry, as in the case of office or laboratory furniture for example, which may be subject to higher quality requirements. For the manufacturing industry, it is therefore advantageous to have access to manufacturing plant with a high vertical range of manufacture that will allow adaptation to a wide range of products without significant effort.

The adhesive plays an important role here. It must have the properties appropriate to the function of the finished workpiece. One requirement, for example, is that what is known as an invisible joint is produced with the help of the adhesive, in other words that this joint is ideally imperceptible to the human eye on the subsequent product. This is achieved, for example, by keeping the layer of adhesive extremely thin and/or ensuring that the colour of the adhesive matches the outer layer of the coating material.

However, a thin layer of adhesive of this kind in a coating material in particular makes it even more expensive and complicated to achieve the optimum application of energy to activate the layer. It must be emphasised here that where possible, energy should only be applied to the adhesive itself, in other words to the functional layer of the coating material. There can be two possible consequences if the application of energy is not regulated sufficiently accurately. If too much energy is applied, burning of the visible layer or outer layer and/or disintegration of the functional layer can be expected, resulting in an unacceptable end result due to visual/functional impairments or a failure of the layer to bond to the workpiece. If too little energy is applied, activation of the functional layer will be insufficient. Consequently, the coating material may not bond to the workpiece or bonding may be insufficient.

In summary, the method described in the prior art presents two challenges. Firstly, it is difficult to adapt an existing system to a wide range of products without considerable effort. Secondly, precise thermal activation is not always possible, particularly in the case of a thin functional layer.

DESCRIPTION OF THE INVENTION

Based on the facts set out above, the object of the present invention was to provide a method and a device for thermally activating a functional layer of a coating material which can be used for a wide range of coating materials or workpieces to be used with the same, and which is easy to adapt to new combinations. To put it another way, it was the object of the present invention to provide a method and a device having a high degree of flexibility in terms of the adhesion for bonding a workpiece surface to a coating material. A further object of the invention was to overcome the disadvantages of the prior art described above in relation to activating the thermal layer, in particular therefore to allow a precise activation of the functional layer of the coating material.

By way of a solution, the present invention provides the method according to claim 1 and the device according to claim 6.

The invention was based on the finding that the problems mentioned above can be solved by means of more precise control of the application of energy to activate the functional layer. It was also recognised that the means of applying energy commonly used in the prior art, in other words with hot air or a laser light, cannot be sufficiently improved to subsequently be more flexible yet able to work with greater precision. Using electromagnetic wave radiation, in particular in the microwave range (approx. 0.3 GHz to 300 GHz), to produce an application of energy was recognised as a possible solution here. Other possible electromagnetic waves include the infrared spectrum, the UV spectrum and the centimetre wavelength range.

Conventional microwave generators work with a magnetron, in other words a vacuum drift tube for generating electromagnetic radiation. In principle, the power and frequency are primarily determined by the design and therefore cannot (readily) be changed. It was further recognised that the use of a semiconductor wave generator can circumvent these disadvantages. CN 105120549 A describes a microwave oven which uses a semiconductor wave generator and is intended for heating foods.

In particular, a conventional microwave generator with magnetron technology can only be regulated with 2-step control, also known as bang-bang control. This means that a controller is only able to switch discretely between two output states, namely full power or no power. As described above, this is attributable to the design of the magnetron, which can only be operated on full power. This means that accurate control as known from control engineering, for example with proportional, integral and differential (PID) control, which would require continuous adjustment of a control variable (in other words the power of the microwave generator), is not possible on principle with this magnetron technology.

Approaches to solve this problem in microwave generators with magnetron technology have been made. For instance, power chokes such as multi-rod tuners (for example, a 3-rod tuner) can be used. However, these are additional sensitive components that necessitate precise calibration, and regulating and adjusting these is also not a trivial matter, rather defeating the object set out above.

Furthermore, microwave generators with magnetron technology are sensitive to vibrations and shocks, in particular but not exclusively during operation of the same. Such vibrations and shocks can result not only in an interruption of the generation of microwaves, but also in the magnetron sustaining lasting damage. However, such stresses are particularly common in the intended industrial field.

Furthermore, there is a difference between the transmission spectrum of wave generators with magnetron technology (I) and the semiconductor wave generator (II) shown. FIG. 3 shows a qualitative representation of these two different transmission spectrums as an application of energy via the frequency. Both wave generators have the same nominal frequency, but this frequency can be set variably as described above with a semiconductor wave generator (II, continuous line) and is determined by the design in the case of a wave generator based on magnetron technology (I, broken line). It can be seen that the transmission spectrum I is significantly broader and also has a lower power density at nominal frequency, whereas transmission spectrum II has a very narrow spectrum and a higher power density.

Due to this higher power density at the transmission frequency of the semiconductor wave generator, an increased conversion of energy is possible in an applicator containing, for example, an object to be heated. This means greater efficiency.

In this context, it should further be pointed out that operating a magnetron means a slow transient response in the power to be produced. This transient response is normally measured in seconds, which is not compatible with the typical cycle times for surfaces of workpieces in coating technology. This also applies to any changes in power introduced by multi-rod tuners. Semiconductor wave generators do not have this time lag and respond almost immediately to such changes.

In view of these findings, the present invention provides a method for thermally activating a functional layer of a coating material. According to the invention, this method comprises the following steps: First the coating material is provided and then fed into a device for thermally activating a functional layer of the coating material. This allows the thermal activation of the functional layer of the coating material to take place, wherein the thermal activation of the functional layer of the coating material is triggered by electromagnetic waves, in particular microwaves which are produced by at least one semiconductor wave generator.

The use of at least one semiconductor wave generator allows precise and variable control of the process of thermally activating the functional layer. Using a single semiconductor wave generator or a plurality of semiconductor wave generators, an extremely quick start-up response to attain serviceability for melting and an extremely precise method in respect of the melting of the functional layer of an edge strip are achieved.

The method can preferably also include the following two steps: recording at least one process variable of the method and then regulating the semiconductor wave generator using this process variable.

Precise adjustment of the thermal activation process can be achieved with control of this kind. In particular, the at least one process variable can be used in the feedback-loop of a PID controller, for example.

More preferably, the at least one process variable can comprise at least the temperature of the functional layer of the edge strip in a particular place before, during or after thermal activation with the semiconductor wave generator, or the power, amplitude or phasing of the incoming or reflected microwaves.

These are examples of preferred process variables which allow adequate control. It should be noted here that a distinction can be made between incoming and reflected microwaves. Incoming microwaves in this context are microwaves which are produced in the semiconductor wave generator and are emitted roughly in the direction of a workpiece. The power transmitted by means of these microwaves is also described as a forward power. Dependent on the technical factors and parameters of the scenario in question, there are also differing intensities of reflected microwaves. These are microwaves which are not absorbed by the functional layer of the workpiece and whose energy was consequently not dissipated in thermal energy. This process variable is therefore an important indicator of whether a set nominal frequency is suitable for heating a functional layer, and a control algorithm used can therefore be regulated at the optimum application of energy to the functional layer by regulating the minimum microwave power reflected.

Even more preferably, the at least one process variable comprises at least a plurality of temperatures from particular areas of the functional layer of the edge strip during or after thermal activation by means of the semiconductor wave generators. This facilitates a specific and defined thermal activation of the functional layer of the coating material.

The temperature of the functional layer of the coating material after the application of energy by means of the semiconductor wave generator is a substantial process variable and can be used as a main process variable for a control process. To reach this value as accurately as possible, it may be preferable to also record other values before and during heating to thus avoid overheating.

A further aspect of heating is a method for applying coating material to an area, in particular a narrow area of a workpiece. This method can comprise the following steps: thermal activation of a functional layer of the coating material followed by injection of the coating material onto the narrow area of the workpiece.

This preferred use of the method described above for heating the coating material can allow the production of the invisible joint described at the beginning of this description, for example.

The invention also provides a device for the thermal activation of a functional layer of a coating material. The device has at least a semiconductor wave generator, wherein the semiconductor wave generator is able to produce electrical waves, preferably microwaves, which are then able to thermally activate the functional layer of the coating material.

This device, which can be used for the methods described above, for example, therefore allows precise and variable control of the process of thermally activating the functional layer.

In addition, this device can preferably have a waveguide which forwards microwaves produced in the semiconductor wave generator to the applicator.

This waveguide is, for example, a coaxial cable or a hollow conductor and connects the source of the microwaves to the place where the microwaves are actually used.

The device preferably also has a device for recording measurements and a control device, wherein the device for recording measurements can record measurements taken during die thermal activation of a functional layer of a coating material and then forward these measurements to the control device, and the control device is able to regulate or control the semiconductor wave generator using the measurements received.

Measurements thus taken can therefore be used as process variables in a regulatory or control method, as shown in relation to the corresponding method for activating a functional layer of a coating material. This allows greater precision to be achieved in the thermal activation of the activation layer of the coating material.

Even more preferably, the device also has an additional semiconductor wave generator and an additional applicator. The first semiconductor wave generator and the additional semiconductor wave generator are more preferably designed such that microwaves are produced which are synchronised by means of PLL synchronisation.

If, for example, a functional layer of a used edge strip requires a comparatively high application of energy, it may be necessary to provide semiconductor wave generators. These can heat the coating material either concurrently or consecutively. For simultaneous heating in particular, the microwaves of the two semiconductor wave generators or plurality of semiconductor wave generators can have a phase displacement such that the resulting, superimposed microwave is subject to destructive interference. This would mean that little or no heating would take place locally. With a PLL (phase-locked loop) synchronisation, this phase displacement is compensated.

The present invention further provides a device for attaching coating material to a narrow area of a workpiece. This device has a device for thermally activating a functional layer of a coating material and an injection device for injecting the coating material onto the narrow area of the workpiece.

This preferred use of the device described above for heating the coating material can enable the invisible joints described at the beginning of this description to be produced, for example.

PREFERRED EMBODIMENTS OF THE PRESENT INVENTION

Figure 1:
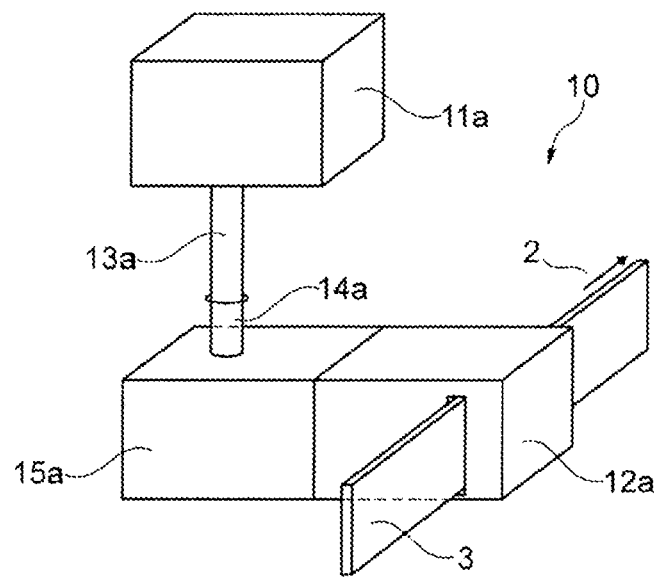
FIG. 1 shows a preferred embodiment of the coating device according to the invention.

FIG. 1 shows an embodiment of the present invention. It should be noted that a number of possible features are included in the embodiment shown to allow a comprehensive understanding of the present invention, which features can be omitted or combined in different configurations according to the aforementioned general summary and the enclosed claims.

FIG. 1 shows a coating material 3 which is transported in a feed device 2 through an applicator 12a of a device for thermally activating a functional layer of a coating material 10 (hereinafter referred to as the device 10). A possible feed device is not shown in this drawing, nor is any other possible injection device for subsequent injection of the coating material. The present description focuses on the device 10 and its interaction with the coating material 3.

In addition to the applicator 12a mentioned at the beginning of the description, the device 10 also has a semiconductor wave generator 11a, a wave conductor 13a, an interface 14a and a coupler 15a.

In the semiconductor wave generator 11a, the microwaves are produced with semiconductor technology. The exact production of the waves in terms of energy level and frequency can be defined with a control loop; this is explained in further detail in relation to FIGS. 2 and 3. The microwaves thus produced are forwarded in the waveguide 13a. The waveguide 13a is connected to the coupler 15a by the interface 14a. This interface can be designed so that these two devices can be disconnected from each other if necessary, for maintenance, for example, or to replace faulty components. The coupler 15a in turn is connected to the applicator 12a. The microwaves thus reach the coating material 3 to thermally activate its activation layer.

It must also be mentioned in this context that the applicator works as a cavity resonator in this preferred embodiment and, on appropriate excitation, a resonance situation within the applicator can be achieved in relation to the behaviour of the electric field strength on the basis of its resonance frequency. The electric field strength within the applicator is thus significantly increased. This has a favourable effect on the application of heat to a coating material with high dielectric losses, which can then be brought to the required temperature more quickly.

Compared to conventional production of microwaves with magnetrons, the entire device 10 can be made considerably more compact in terms of the space required by using a semiconductor wave generator. This is particularly attributable to the fact that there is no need to provide a separate circulator for the purposes of deflecting reflected microwaves. In fact, a bleeder resistor built into the semiconductor wave generator can be used that will perform the function of a circulator. In addition, the function elements can predominantly be incorporated into the design of the semiconductor generator and therefore also be designed in a considerably more compact configuration.

Figure 2:
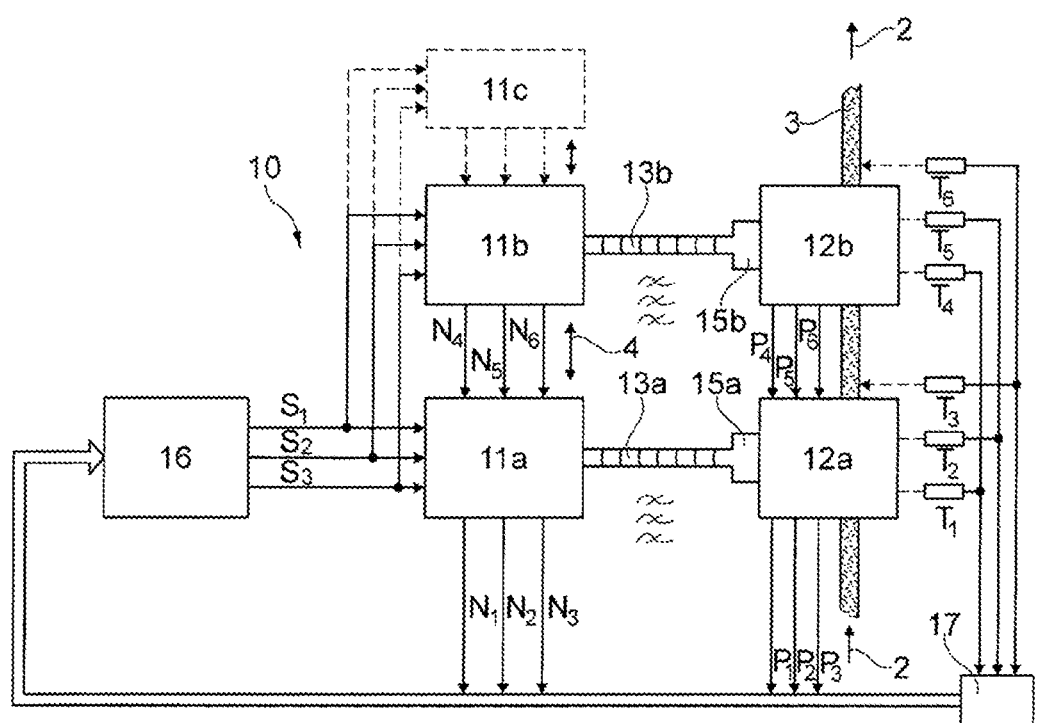
FIG. 2 is a functional diagram of a preferred embodiment of the coating device according to the invention.

FIG. 2 shows a functional diagram of a preferred embodiment of the device. This has been expanded compared to the components from FIG. 1 to include the following components: The device 10 also has an additional semiconductor wave generator 11b, an additional applicator 12b, an additional waveguide 13b, an additional interface (not shown) and an additional coupler (not shown). If, for example, the power of the semiconductor wave generator 11a is not sufficient, this additional semiconductor wave generator 11b can be used. PLL synchronisation is provided between these semiconductor wave generators 11a and 11b which ensures that any phase deviation between the microwaves of the two semiconductor wave generators 11a and 11b is kept to a minimum. This prevents destructive interference, which admittedly would not occur in the embodiment shown here with a plurality of applicators 12a and 12b but would enable the semiconductor wave generators 11a and 11b to be operated with a single applicator. An additional semiconductor wave generator 11c is also indicated, which would allow the generation of additional power. Not shown are a corresponding applicator 12c, a waveguide 13c, an interface 14c and a coupler 15c for applying thermal power to a third position. In an alternative embodiment, not shown, several semiconductor wave generators can apply the electromagnetic waves in a single applicator to a coating material. This may be preferable, as the cost of the additional applicator can be saved with this embodiment.

Furthermore, the recording and processing of process variables are also shown in this drawing. The process variables $N_i$ from the semiconductor wave generators (hereinafter referred to, in short, as process variables $N_i$) comprising various process variables $N_i$ to $N_3$ of the semiconductor wave generator 11a, and so on, are forwarded to a control device 16. Examples of process variables $N_i$ include the frequency of the microwaves produced and their power (in other words, the forward power).

The same applies to process variables $P_i$ from the applicators (hereinafter referred to, in short, as process variables $P_i$); these process variables Pi are also forwarded to a control device 16. Examples of process variables $P_i$ include the frequency of the reflected microwaves and their power (in other words the reflected power).

Other process variables can be measured. For example, the temperature of the continuous coating material is measured at various points; these temperatures are process variables $T_i$. A device 17 for recording measurements is provided in this embodiment for recording these process variables $T_i$.

In summary, these process variables $N_i$, $P_i$ and $T_i$ are forwarded to a control device 16. This control device 16 has, for example, a PID controller which is able to produce control values Si with these process variables $N_i$, $P_i$ and $T_i$ that are forwarded to the semiconductor wave generators 11a and 11b. Examples of these control values Si are the frequency and power of the semiconductor wave generators 11a and 11b.

Due to the adjustable transmission frequency on the semiconductor wave generators 11a and 11b, the adaptation of the resonance condition to the heating medium can, unlike with conventional production of microwaves, be done with a magnetron without additional tuning elements (such as a linear or rotatory tuner). The adaptation can only be achieved by means of targeted control of the transmission frequency of the semiconductor wave generators 11a and 11b. The properties relevant to microwaves of a medium used can therefore also change during operation.

To this end it is necessary to simply measure a reflected power from the loading of the applicator with coating material and to factor this into the calculation of the control variable. If, for example, the free volume within the applicator is reduced, its resonance frequency is typically actually increased, therefore the target frequency of the microwave from the generator is reduced accordingly, and vice versa.

To this end, the forward and reflected power, or the forward and reflected microwaves, are measured with suitable measuring devices such as directional couplers and taken into consideration in a control loop for setting the ideal frequency for the microwave. This is explained further in relation to FIG. 4. It is therefore possible to configure the optimum behaviour of the power of the semiconductor wave generators 11a and 11b for the medium to be heated, in other words for the functional layer of the edge strip of the invisible joint.

The transmission frequency can technically be adjusted with a frequency synthesiser. Resonators are thus easier to implement, as the resonance condition can be adapted to the load by means of the frequency and there is therefore no need for additional tuning elements. This also reduces costs and results in a more compact applicator design. In addition, the amount of installed technology is reduced. Control concepts in which the reflection coefficient is maintained at a minimum or desired value using a suitable algorithm can be achieved more appropriately with a semiconductor wave generator. Superimposed process controls with additional process variables can thus be implemented more easily, as will be shown in relation to FIG. 4.

Figure 3:
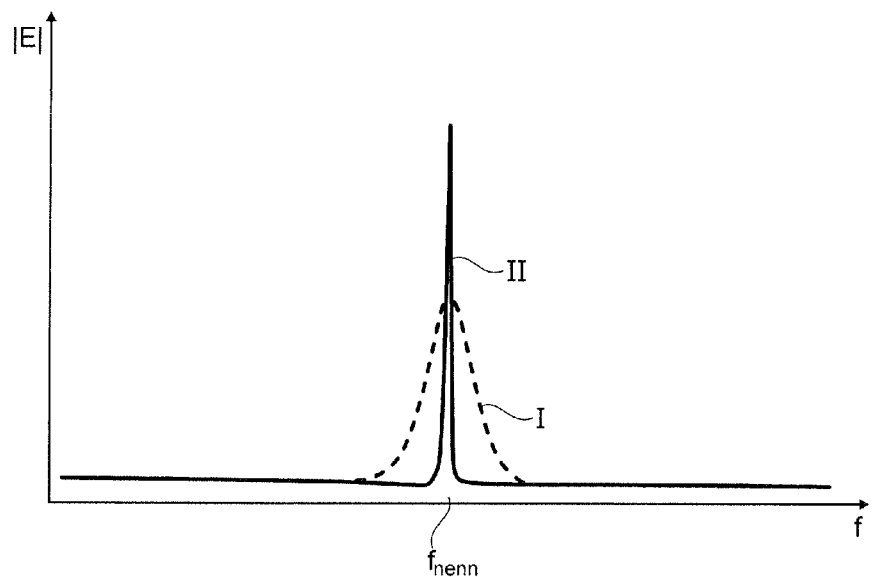
FIG. 3 shows a graph of an application of energy applied via the frequency of various microwave generators.

FIG. 3 shows a qualitative representation of two exemplary transmission spectrums of a magnetron I and a semiconductor wave generator II as an amount of energy applied via the frequency. Both microwave generators have the same nominal frequency; this can be adjusted variably as described above with a semiconductor wave generator (II, continuous line) and is determined by the design in the case of a microwave generator which is based on magnetron technology (I, broken line). It can be seen that the transmission spectrum I is significantly broader and also has a lower power density at nominal frequency, whereas transmission spectrum II has a very narrow spectrum and a higher power density. Further advantages and comparisons of the various technologies for generating microwaves are described in the introductory section.

Figure 4:
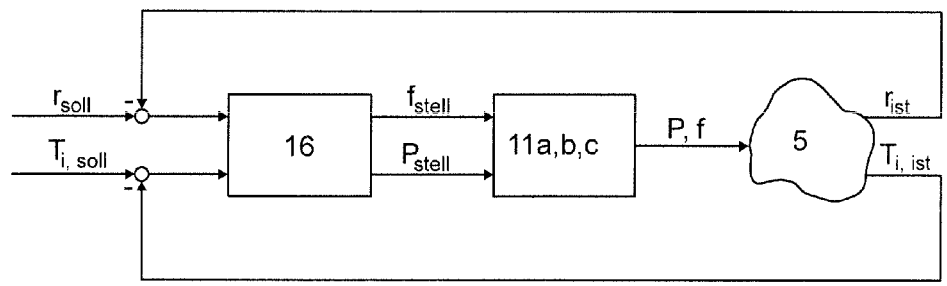
FIG. 4 shows a control loop of a preferred embodiment of the device according to the invention or the corresponding method.

FIG. 4 shows a control loop of a preferred embodiment of the device according to the invention or the corresponding method. This is a twin-circuit control loop, in other words a loop that provides a single control in relation to two parameters.

Firstly, the temperature process variable $T_i$ is controlled. This can be provided as the main process variable, as the final temperature of a functional layer of a coating material is of crucial importance. A target temperature $T_{i,target}$ can be specified for each individual temperature measuring point, and this measuring point must be reached as accurately as possible. The actual values for the temperature of an activation process 5, which correspond to the measured status variables, are accordingly incorporated into the control device 16 by means of feedback loop.

A further process variable is the reflection coefficient r. This is derived from a comparison of the forward power, in other words the power of the semiconductor wave generators and the reflected power, or the reflected power that was not dissipated by the functional layer of the coating material. A change in this variable can be achieved in particular by varying the frequency. These variables can accordingly be linked to each other using a control algorithm, in other words if the reflection coefficient $r_{actual}$ is not optimal, the frequency can be varied. The reflection coefficient will preferably be maintained at a very low value, for example at no more than −10 to −20 dB or even more preferably at 0.

The integration of a field bus and controller is easily possible with a controlled system of this kind.

The invention claimed is:

1. A method for thermally activating a functional layer of a coating material, wherein the method comprises the following steps:
providing the coating material;
feeding the coating materials into a device for thermally activating a functional layer of the coating material; and
thermally activating the functional layer of the coating material,
wherein the thermal activation of the functional layer of the coating material is performed by electromagnetic waves that are synchronised via phase-locked loop (PLL) synchronisation, the electromagnetic waves being produced by first and second semiconductor wave generators.

2. The method according to claim 1 also having the following steps:
recording at least one process variable ($T_i$, $P_i$, $N_i$) of the method,
controlling at least one of the first or second semiconductor wave generators using this process variable ($T_i$, $P_i$, $N_i$).

3. The method according to claim 2, wherein the at least one process variable ($T_i$, $P_i$, $N_i$) comprises at least a temperature of the functional layer of an edge strip at a particular point before, during or after thermal activation with the semiconductor wave generators or a power, amplitude or phasing of incoming or reflected microwaves.

4. The method according to claim 2, wherein the at least one process variable ($T_i$, $P_i$, $N_i$) comprises a plurality of temperatures from the functional layer of an edge strip at particular points before, during or after thermal activation with the semiconductor wave generators to thus allow a specific and defined thermal activation of the functional layer of the coating material.

5. The method according to claim 1, further comprising, prior to the thermally activating, applying the coating material to a narrow area of a workpiece via injection of the coating material onto the narrow area of the workpiece.

6. A device for thermally activating a functional layer of a coating material having:
at least one semiconductor wave generator and an additional semiconductor wave generator,
wherein the at least one semiconductor wave generator is able to produce electromagnetic waves which are then able to thermally activate the functional layer of the coating material, the at least one semiconductor wave generator and the additional semiconductor wave generator being designed to produce electromagnetic waves that are synchronised via phase-locked loop (PLL) synchronisation.

7. The device according to claim 6 also having:
an applicator; and
a waveguide which is able to forward electromagnetic waves produced in the semiconductor wave generator to the applicator, in order to thermally activate the functional layer of the coating material there.

8. The device according to claim 6 also having:
a device for recording measurements and a control device,
wherein the device for recording measurements is designed to record measurements taken during thermal activation of a functional layer of a coating material and then forward these measurements to the control device, and
the control device is designed to regulate or control the semiconductor wave generator using the measurements received.

9. The device according to claim 7 also having:
an additional applicator and an additional waveguide which is able to forward electromagnetic waves produced in the additional semiconductor wave generator to the additional applicator.

10. A device for applying coating material to a narrow area of a workpiece having:
a device for thermally activating a functional layer of a coating material according to claim 6, and
an injection device for injecting the coating material onto the narrow area of the workpiece.

11. A device for thermally activating a functional layer of a coating material having:
a first semiconductor wave generator; and
a second semiconductor wave generator,
wherein the first semiconductor wave generator and the second semiconductor wave generator are designed to produce electromagnetic waves that (i) are able to thermally activate the functional layer of the coating material and (ii) are synchronised by means of PLL synchronisation.

12. The device according to claim 11, further comprising a first applicator for delivering the electromagnetic waves to thermally activate the functional layer of the coating material.

13. The device according to claim 12, further comprising a first waveguide configured to direct electromagnetic waves produced in the first semiconductor wave generator to the first applicator for thermally activating the functional layer of the coating material.

14. The device according to claim 12, further comprising a second applicator for delivering the electromagnetic waves to thermally activate the functional layer of the coating material.

15. The device according to claim 14, further comprising a second waveguide configured to direct electromagnetic waves produced in the second semiconductor wave generator to the second applicator for thermally activating the functional layer of the coating material.

16. The device according to claim 11 also having a device for recording measurements, wherein the device for recording measurements is designed to record measurements taken during thermal activation of a functional layer of a coating material.

17. The device according to claim 16 wherein the device further comprises a control device, and wherein the device for recording measurements is designed to forward the measurements taken during thermal activation of a functional layer of a coating material to the control device, the control device being configured to regulate or control the at least one of the first or second semiconductor wave generators using the measurements received from the device for recording.

* * * * *